(12) United States Patent
Garcia

(10) Patent No.: US 6,694,195 B1
(45) Date of Patent: Feb. 17, 2004

(54) DIAGNOSTIC SYSTEM FOR IRRIGATION CONTROLLERS

(75) Inventor: Richard J. Garcia, Redlands, CA (US)

(73) Assignee: The Toro Company, Bloomington, MN (US)

( * ) Notice: Subject to any disclaimer, the term of this patent is extended or adjusted under 35 U.S.C. 154(b) by 535 days.

(21) Appl. No.: 09/783,761

(22) Filed: Feb. 14, 2001

(51) Int. Cl.⁷ ............................................... G05D 11/00
(52) U.S. Cl. .................. 700/26; 700/284; 137/624.11; 239/69
(58) Field of Search ............................. 700/14, 16, 23, 700/26, 283, 284; 137/624.11; 239/67–70

(56) References Cited

U.S. PATENT DOCUMENTS

| | | |
|---|---|---|
| 4,646,224 A | 2/1987 | Ransburg et al. |
| 4,852,051 A | 7/1989 | Mylne |
| 4,937,746 A | 6/1990 | Brundisini |
| 5,272,620 A | 12/1993 | Mock et al. |
| 5,337,957 A | 8/1994 | Olson |
| 5,381,331 A * | 1/1995 | Mock et al. ................. 700/284 |
| 5,444,611 A * | 8/1995 | Woytowitz et al. .......... 700/284 |
| 5,653,389 A | 8/1997 | Henderson et al. |
| 5,870,302 A | 2/1999 | Oliver |
| 5,921,280 A | 7/1999 | Ericksen et al. |
| 5,960,813 A | 10/1999 | Sturman et al. |
| 5,961,040 A | 10/1999 | Traylor et al. |
| 6,089,743 A | 7/2000 | McQuinn |
| 6,098,898 A | 8/2000 | Storch |
| 6,102,061 A | 8/2000 | Addink |
| 6,108,590 A | 8/2000 | Hergert |
| 6,490,505 B1 * | 12/2002 | Simon et al. ................. 700/284 |
| 6,507,775 B1 * | 1/2003 | Simon et al. ................. 700/284 |
| 2003/0182022 * | 9/2003 | Addink et al. ............... 700/284 |

* cited by examiner

Primary Examiner—Emanuel Todd Voeltz
(74) Attorney, Agent, or Firm—Stout, Uxa, Buyan & Mullins, LLP (57) ABSTRACT

Remote diagnosis of an irrigation controller is made possible by encoding the settings of the controller into a numeric or alphanumeric code, displaying that code on the controller, transmitting the code to a remote interpretive computer, generating at that computer a chart derived from the code to show all of the settings of the controller, evaluating the significance of the settings to the functioning of the controller, and advising the operator of the controller on the basis of the chart.

7 Claims, 3 Drawing Sheets

CONTROLLER

4461R ⊕

DIAGNOSTIC CODE 5221 2245 7164 3241 0700 2305 0830 2350 1527 04

START TIME INFORMATION

CURRENT A CYCLE DAY: 2
START A1: 7:00 AM
START A2: 11:05 PM

CURRENT B CYCLE DAY: 1
START B1: 7:30 AM
START B2: 11:50 PM

WATER DAYS A
○ EVERY 4th DAY
● EVERY 3rd DAY
○ EVERY 2nd DAY
○ EVERY DAY
○ OFF

WATER DAYS B
● EVERY 4th DAY
○ EVERY 3rd DAY
○ EVERY 2nd DAY
○ EVERY DAY
○ OFF

ZONE INFORMATION

| | RUN TIME | PROGRAM | STATUS |
|---|---|---|---|
| ZONE 1 | 20 | B | OK |
| ZONE 2 | 10 | AB | OK |
| ZONE 3 | 10 | A | OK |
| ZONE 4 | 15 | MANUAL | SHORT |
| ZONE 5 | 40 | AB | OK |
| ZONE 6 | 30 | OFF | OK |

SPECIAL DIAGNOSIS

B2 SETTING INOPERATIVE, SET B2 START TIME PAST MIDNIGHT

Fig. 4

DIAGNOSTIC SYSTEM FOR IRRIGATION CONTROLLERS

FIELD OF THE INVENTION

This invention relates to diagnostic systems for irrigation controllers, and more particularly to a system using a code displayed by the controller to obtain an analysis of the settings of the controller.

BACKGROUND OF THE INVENTION

With the increasing use of digital displays In a multitude of devices including irrigation controllers, it has become common to program controllers through a keyboard or other device from which the current setting of a variety of irrigation parameters is not immediately discernible by a cursory visual inspection. In addition, complex controllers capable of running several selectable programs on a common set of sprinkler valves can be inadvertently set to conflicting programs that result in unintended watering modes or malfunctions.

Complete irrigation controllers are routinely marketed to homeowners who are not technically skilled or who, after an initial installation, have difficulty resetting the watering parameters when a change of seasons or other circumstances require it. It therefore happens frequently that an unintended water pattern or even failure to operate leaves the homeowner unsure whether it was caused by misprogramming or by some equipment failure. Diagnosis of the problem by reprogramming can be frustrating and time consuming, and may not be successful. It is therefore desirable to provide a simple, effective diagnostic method by which a homeowner can obtain an accurate analysis of the controller without reprogramming it.

SUMMARY OF THE INVENTION

The invention provides a simple diagnostic method for even highly complex controllers by generating and displaying on the controller a numeric or alphanumeric code representing the current setting of all the parameters that can be set on the controller. If a problem occurs, the homeowner transmits, manually or automatically, the code and perhaps the model number of the controller to the web page of the manufacturer or to any other appropriate customer service facility, e.g. by telephone.

The transmitted code is decoded by an interpretive computing device and is translated into a chart or other informational format which informs the homeowner or the service representative of the actual settings of the controller. The chart may also provide information on conflicts or other unexpected functioning of the controller that may result from such settings. A customer service representative or computing device may thereby, through written or verbal instructions, direct the homeowner to make the appropriate resettings to correct the problem.

DESCRIPTION OF THE PREFERRED EMBODIMENT

Sophisticated irrigation controllers for residential use are typically programmable by keying in at least portions of the desired settings, rather than solely by operating switches whose positions are readily visually discernible. For example, one commercially available residential controller allows setting up to 12 irrigation circuits to three independent programs, each with three selectable starting times settable to a specific hour and minute on recurring or selected days within a 365-day calendar, with water budgeting and automatic, semi-automatic and manual modes. All of these settings are achieved with two switches, four pushbutton keys, and a selector dial. Consequently, even with an LCD display, observation of all the settings by visual inspection of the controller is essentially impossible. The same problem exists, albeit in a lesser degree, in less sophisticated hybrid switch and key controllers. For clarity, the invention is described herein in connection with one of the latter controllers, although the principles of the invention are applicable to any controller.

Figure 1:
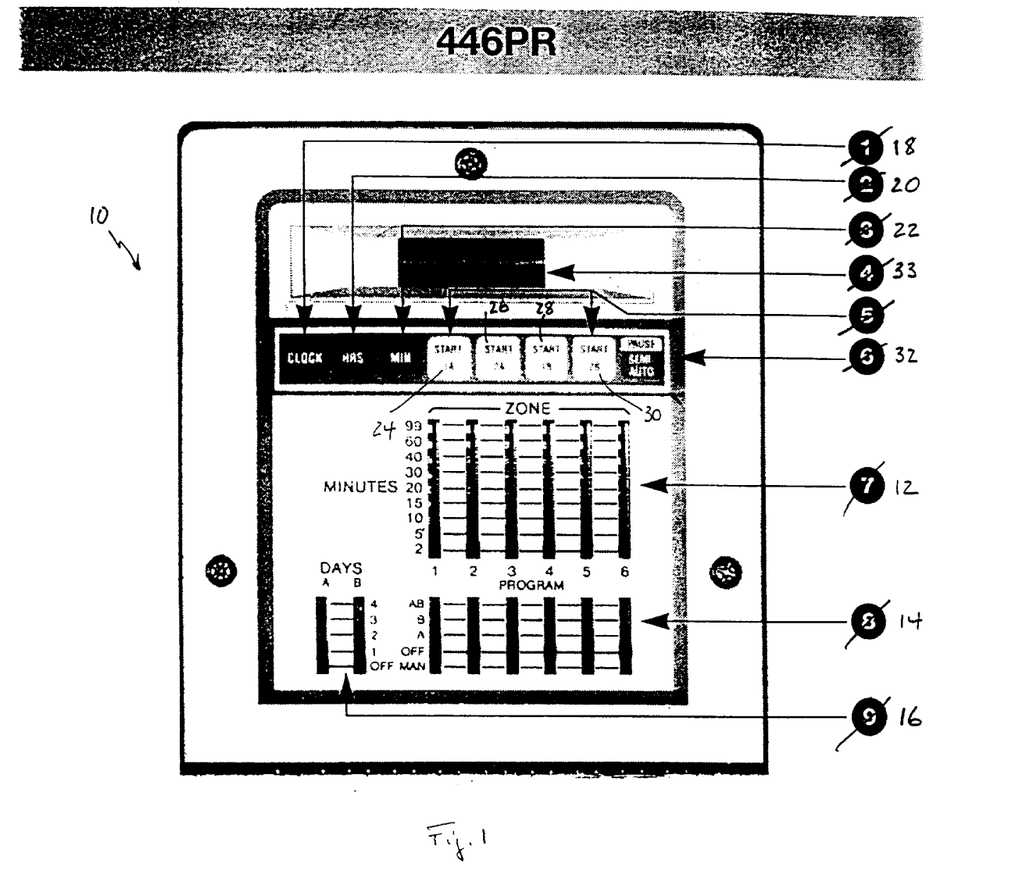
FIG. 1 is a front elevation of an irrigation controller suitable for use with the invention.

FIG. 1 shows the control panel of a typical hybrid controller, in this instance the Irritrol® 446 PR controller manufactured by The Toro Company, Irrigation Division, of Riverside, Calif. The controller 10 controls six sprinkler circuits or zones. The run time of each zone may be set by the run time switches 12. The controller 10 allows two independent irrigation programs A and B. Program switches 14 allow each zone to be set to run on program A, program B, both programs, not at all, or manually. Day switches 16 allow each of the programs A or B to be run every day, every second day, every third day, every fourth day or never.

The positions of the switches 12, 14 and 16 are visually observable. A number of other settings, however, are controlled by push buttons or keys 18 through 32, and are not directly observable. Key 18 initiates the clock mode; keys 20 and 22 set the hour and minute of various functions; keys 24 and 26 initiate the setting of start times for program A; keys 28 and 30 initiate the setting of start times for program B; and Pause/Semi-Auto key 32 can be used to either interrupt a watering cycle in progress, or to start a semi-automatic watering cycle (i.e. a single sequential operation of all zones for their set run times) when no cycle is in progress.

A display 33 is provided to show the time when no watering is in progress; the zone being watered and the watering time elapsed; and the identity of any zone whose circuitry has shorted out and has been turned off by the controller's electronic circuit breaker.

In accordance with the invention (FIG. 2), the controller 10 is equipped with a microcontroller including, i.a., a microprocessor 18 associated with a memory 20. The memory 20 is so connected to all the functions of the controller 10 as to contain the current status of all of the switches 12, 14 and 16 as well as the set cycle start times, the pause/semi-automatic status, and optionally the current watering zone and elapsed time, as well as the identity of any shorted circuit.

Figure 2:
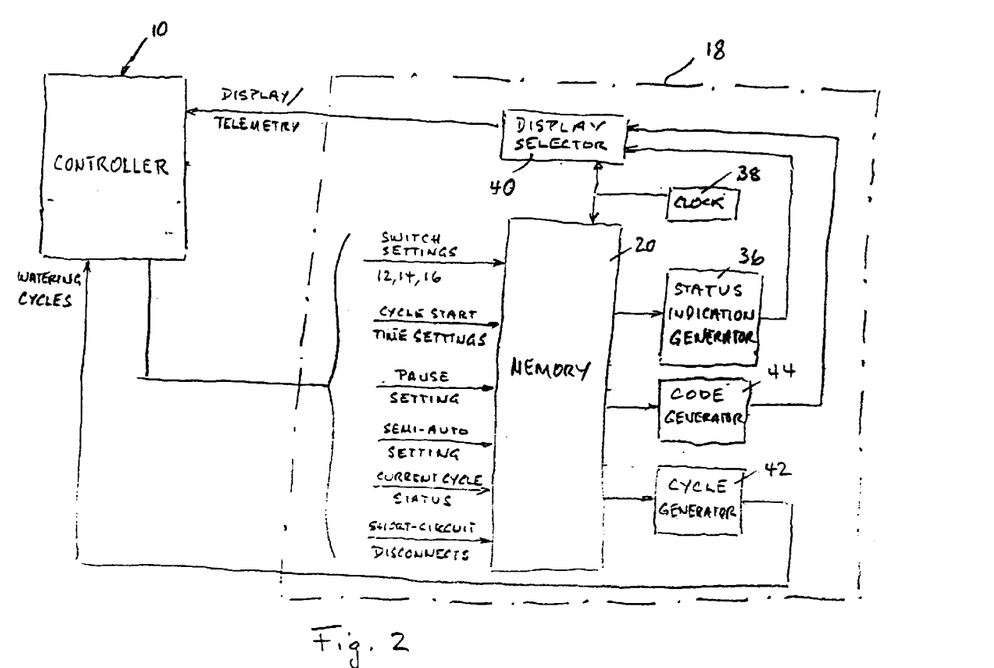
FIG. 2 is a block diagram of the controller and its microprocessor.

Normally, a display 34 on the panel of contoller 10 indicates the current status of a cycle in progress, from a status indication generator 36, the current time from the microprocessor clock 38, or other information during the setting process, under the control of display selector 40. The microprocessor 18 operates the watering cycles of the controller 10 through a cycle generator 42 responsive to the cycle information stored in memory 20.

Upon simultaneously pressing any two of the buttons 18–32, the microprocessor 18 scans the memory 20 and causes the code generator 44 to generate therefrom a numerical or alphanumeric code representative of the settings stored in the memory 20. For example, with the run time switches 12 each having nine positions illustrated in FIG. 1, and the program selector switches 14 each having five positions illustrated in FIG. 1, the zone settings may be expressed, for example, by the zone set code 5231 3345

7164. This would translate to zone 1 being set to run 20 minutes on program B, zone 2 10 minutes on program A and B, zone 3 10 minutes on program A, zone 4 running on manual (its 15-minute run time setting is moot in that mode), zone 5 40 minutes on programs A and B, and zone 6 being off (again, its 30-minute run time setting is moot).

Following the above-described zone set code, the microprocessor 18 may generate a day set code representative of the repetition settings of programs A and B. For example, a day set code of 3241 may indicate that program A is set to run every third day and is currently in the second day of its three-day cycle, and that program B is set to run every fourth day and is currently in the first day of Its four-day cylce.

Next, the start times of programs A and B may be directly encoded; e.g. 0700 2305 0730 2350 would mean that the zones set to program A will run starting at 7 a.m. and 11:05 p.m., and the zones set to program B will run starting at 7:30 am. and 11:50 p.m. The zones set to A and B will run starting at 7 am., 7:30 a.m., 11:05 p.m. and 11:50 p.m.

In the controls described herein, every twelfth day is a day on which programs A and B both run. Because watering cycles run in sequence, and program A runs for one hour (zone 2 for 10 minutes, zone 3 for 10 minutes, and zone 5 for 40 minutes), the first cycle of program B will not start until 8 a.m. on those days.

Finally, a code of 1527 may indicate that the current time on the controller clock is 3:27 p.m., and a code of 1, 2 or 0 may mean that the pause/semiautomatic function is in pause mode, semiautomatic mode, or neither. An additional digit of 0 to 6 may indicate the number of any zone (e.g. zone 4) which is electronically disabled due to a short circuit.

In the particular controller described herein, the foregoing settings will produce a problem. Any watering cycle that runs past midnight will cancel any subsequently starting cycles that start before midnight. Thus, the start of program A at 11:05 p.m. calls for a one-hour cycle (zone 2 for 10 minutes, zone 3 for 10 minutes, and zone 5 for 40 minutes). That cycle does not end until after midnight, and it therefore cancels the program B start scheduled for 11:50 p.m.

Thus, the homeowner is likely to notice sooner or later that no watering is taking place at 12:30 a.m., when program B should be running. Unless the homeowner has very carefully read the manual and remembers this peculiarity of the controller, he will assume that the controller is malfunctioning.

Other problems may arise from a forgotten "pause" setting which stops all watering until it resets itself at midnight, from a forgotten "manual" setting that prevents Its zone from shutting off, or from an unnoticed short circuit in the wiring of a zone.

Figure 3:
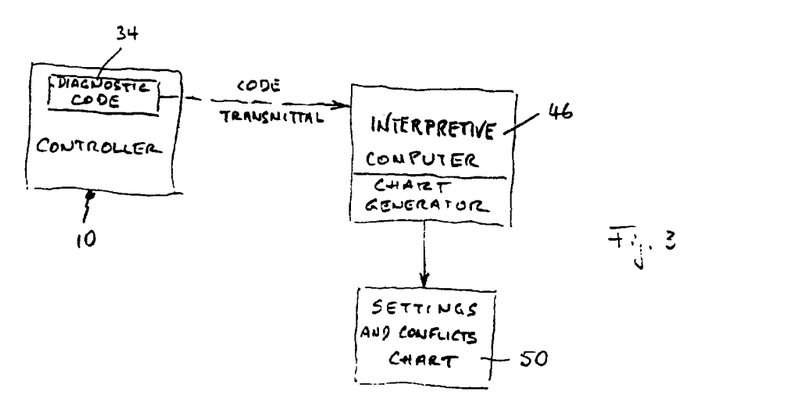
FIG. 3 is a block diagram illustrating the interrelation between the controls and the interpretive computer.
Figure 4:
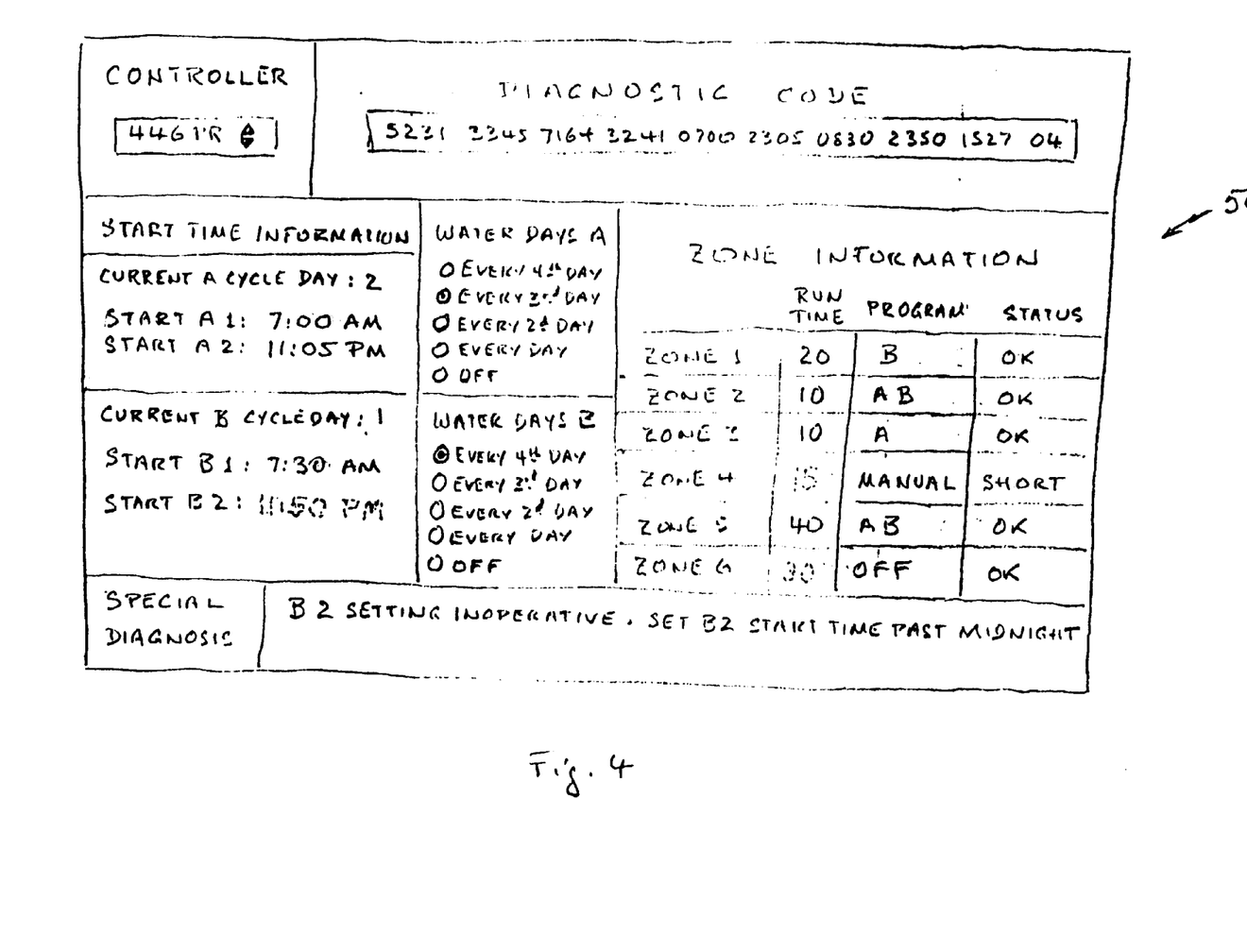
FIG. 4 shows an exemplary evaluation chart produced by the invention.

The homeowner may now contact the manufacturer by accessing its web page or calling its customer service number. The web page will instruct the homeowner to enter, or the customer service agent will instruct the homeowner to read off, the controller's model number and the diagnostic codes displayed when two of the buttons 18–32 are simultaneously pressed. Alternatively, the diagnostic codes may be transmitted by any appropriate conventional telemetry device or computer link. Thus, the manufacturer's interpretive computer 46 (FIG. 3) is supplied, in the described instance, with the model number 446 PR and the code 5231 3345 7164 3241 0700 2305 0830 2350 1527 04. A chart generator 48 in the interpretive computer 46 is programmed to translate this code into a chart 50 (FIG. 4) showing the current settings of all controls, programs, features and conditions of the controller. This chart may be displayed to the homeowner on the web page, printed out by fax, or displayed to a customer service representative for advising the homeowner.

In the described example, the manufacturer's computer is preferably programmed to recognize the cancellation of the 11:50 p.m. program B start and may print out a recommendation that the start time of that program be moved past midnight.

It will be understood that the foregoing description is but one example of the invention, and that the invention may be embodied in a wide variety of irrigation controllers and programs. The gist of the invention, i.e. the encoding of the controller's settings into an alphanumeric code for display and/or transmission to an interpretive computer for the generation of a chart showing the settings, is thus applicable to any situation in which an unsophisticated controller operator needs to diagnose the status of a complex irrigation controller.

I claim:

1. A diagnostic system for irrigation controllers, comprising:

a) a controller arranged to operate at least one watering zone in accordance with at least one watering program having selectable settings stored in a memory associated with said controller;

b) a selectably actuatable code generator associated with said controller and arranged to generate a code representative of said settings;

c) an interpretive computing device and;

d) means for conveying said code to said computing device;

e) said computing device being arranged to determine from said code said settings and to display said settings.

2. The system of claim 1, in which said computing device is remote from said controller.

3. The system of claim 1, in which said code is selectably displayed at said controller.

4. The system of claim 1, further comprising a plurality of watering programs and a plurality of zones each operable in accordance with a selectable one of said programs, said code including information regarding the run time and program associated with each zone, and the watering start times associated with each program.

5. A method of diagnosing malfunctions in an irrigation system operated by a settable controller, comprising the steps of:

a) generating in said controller a code representative of the settings of said controller;

b) transmitting said code to an interpretive computing device;

c) causing said computing device to generate from said code indicia showing the settings of said controller; and d) displaying said indicia for evaluation of said settings.

6. The method of claim 5, wherein said computing device and said controller are remote from one another, and which further comprises the step of:

e) transmitting said evaluation to the operator of said controller.

7. The method of claim 5, in which said system includes a plurality of watering zones and a plurality of watering programs selectable for each of said zones, and said chart displays for each zone its selected run time and program, and for each program the start times of that program.

* * * * *

UNITED STATES PATENT AND TRADEMARK OFFICE
CERTIFICATE OF CORRECTION

PATENT NO. : 6,694,195 B1
DATED : February 17, 2004
INVENTOR(S) : Richard J. Garcia It is certified that error appears in the above-identified patent and that said Letters Patent is hereby corrected as shown below:

Title page,
Item [73], Assignee, "The Turo Company, Bloomington, MN (US)" should read
-- Assignee: The Toro Company, Bloomington, MN (US) --

Drawings,
Please replace Figs. 1, 2, 3 and 4 with the attached.

Column 2,
Line 38, "A display 33 is" should read -- A display 34 is --

Column 3,
Line 61, "3345 7164 3241 0700 2305 0830 2350 1527 04." should read -- 3345 7164 3241 0700 2305 0730 2350 1527 04 --

Signed and Sealed this

Twenty-seventh Day of July, 2004

JON W. DUDAS
*Acting Director of the United States Patent and Trademark Office*

| CONTROLLER | DIAGNOSTIC CODE | | | | |
|---|---|---|---|---|---|
| 446PR | 5231 3345 7164 3241 0700 2305 0730 2350 1527 04 | | | | |

| START TIME INFORMATION | WATER DAYS A | ZONE INFORMATION | | | |
|---|---|---|---|---|---|
| CURRENT A CYCLE DAY: 2 | ○ EVERY 4th DAY<br>⦿ EVERY 3rd DAY<br>○ EVERY 2nd DAY<br>○ EVERY DAY<br>○ OFF | | RUN TIME | PROGRAM | STATUS |
| START A1: 7:00AM<br>START A2: 11:05PM | | ZONE 1 | 20 | B | OK |
| | | ZONE 2 | 10 | AB | OK |
| CURRENT B CYCLE DAY: 1 | WATER DAYS B | ZONE 3 | 10 | A | OK |
| | ⦿ EVERY 4th DAY<br>○ EVERY 3rd DAY<br>○ EVERY 2nd DAY<br>○ EVERY DAY<br>○ OFF | ZONE 4 | 15 | MANUAL | SHORT |
| START B1: 7:30AM<br>START B2: 11:50PM | | ZONE 5 | 40 | AB | OK |
| | | ZONE 6 | 30 | OFF | OK |
| SPECIAL DIAGNOSIS | B2 SETTING INOPERATIVE, SET B2 START TIME PAST MIDNIGHT | | | | |

*FIG. 4*